Patented May 13, 1941

2,241,709

UNITED STATES PATENT OFFICE 2,241,709

REMOVAL OF THIONATES FROM SOLUTION

Norman Levy, Norton-on-Tees, England, assignor to Imperial Chemical Industries Limited, a corporation of Great Britain No Drawing. Application February 4, 1939, Serial No. 254,729. In Great Britain February 8, 1938

6 Claims. (Cl. 23—178)

This invention relates to the removal of thionates from solution, in particular from aqueous absorbents used for the recovery of sulphur dioxide from gaseous mixtures containing it, an example of such an aqueous absorbent being a solution of basic aluminium sulphate, the use of which is described and claimed in British patent specification No. 445,711.

When aqueous absorbents are used for the recovery of sulphur dioxide from gaseous mixtures as obtained for example during the roasting of pyrites, the gases are treated with the absorbent liquor from which gaseous sulphur dioxide is recovered by heating in a subsequent stage, the stripped liquor being returned to the absorption stage.

In such absorption-regeneration processes for the recovery of sulphur dioxide a small portion of the absorbed sulphur dioxide is unavoidably oxidised to sulphur trioxide, accompanied by the liberation of elemental sulphur, according to the equation $3SO_2 \rightarrow 2SO_3 + S$, so that this reaction is injurious to efficiency of operation with respect to the recovery of sulphur dioxide. It is apparent therefore that the presence of any substance tending to accelerate this reaction is to be avoided.

I have now found that the reaction $$3SO_2 \rightarrow 2SO_3 + S$$

is catalysed by the presence of polythionates. From many sources, the sulphur-dioxide containing gases also contain hydrogen sulphide and/or elemental sulphur, so that all the constituents necessary for the formation of thionates can enter the liquor: thus, catalysis of the above-mentioned reaction soon sets in. As the reaction $3SO_2 \rightarrow 2SO_3 + S$ proceeds, more elemental sulphur becomes available, and this reacts with more sulphur dioxide to form further quantities of the thionates.

It is thus evident that as the concentration of thionates increases in absorbent liquors used for the recovery of sulphur dioxide, the process of absorption and regeneration will become increasingly inefficient with respect to the yield of sulphur dioxide, due to the oxidation of sulphur dioxide to the trioxide, according to the equation $3SO_2 \rightarrow 2SO_3$, and also due to the consumption of sulphur dioxide in the formation of thionates. Therefore in the operation of absorption regeneration processes for the recovery of sulphur dioxide in which aqueous absorbents are used, it is extremely desirable to remove the thionates.

It is known that trithionate contained in solution can be destroyed by the addition of a copper salt, for example, copper sulphate, followed by boiling, whereby a precipitate of copper sulphide is thrown down and sulphuric acid is formed. If, however, copper sulphate is added to a solution containing poly-thionates followed by boiling, reaction does not proceed to completion, only the trithionate being destroyed.

If sufficient sulphur dioxide is present in solution, the poly-thionates ultimately form the trithionate, so that, in the presence of copper ions, the thionates originally present in the solution can be destroyed rapidly and completely. However, when this method of decomposing thionates is applied to their removal from aqueous absorbents for sulphur dioxide, it is found that the presence of even a small excess of copper ions necessarily present in the liquor to obtain complete removal of the thionates, leads later to the deposition of copper sulphide on the walls and packing of the apparatus. Where a boiler is used for the regeneration of the absorbent, copper sulphide deposits in it and leads to a rapid drop in heat transfer coefficient, so that the heating element requires to be washed out more frequently, while, in any case, complete removal of the copper sulphide scale is extremely difficult. Deposition of copper sulphide on the packing of the regeneration tower leads to increased pressure drop across the tower and may even lead to complete stoppage. Further, the presence of this copper sulphide in the regeneration tower packing gives rise to the formation of small quantities of hydrogen sulphide which nevertheless are sufficient to cause the formation of further quantities of the undesirable thionates. It is thus seen that the removal of thionates by the method of decomposing them with copper salts from aqueous absorbents for sulphur dioxide leads to difficulties as great as those due to the thionates which it is intended to remove.

This invention has as an object to devise a method whereby the polythionates can be removed from the absorbent without the disadvantages attendant on known processes. A further object is to devise such a method which will not result in deposits of copper sulphide. A still further object is to devise such a method which will simultaneously reduce the formation of $SO_3$. Further objects will appear hereinafter. These objects are accomplished by this invention which is based on the following discovery.

I have found that the reaction $3SO_2 \rightarrow 2SO_3 + S$ is auto-catalytic; that is, the rate of reaction increases as the concentration of the thionates increases. Further investigations have revealed, however, that at concentration of thionates lower than that equivalent to 0.15 gm. of oxidisable sulphur per 100 milliliters the rate of conversion of sulphur dioxide to sulphuric acid and elemental sulphur is slow, but above this concentration the rate becomes very much increased, and if a concentration equivalent to more than 0.18 gm. of oxidisable sulphur per 100 milliliters is exceeded then the plant has soon to be completely shut down for an extensive and uneconomical period in order for the system to be thoroughly freed from elemental sulphur. By the term "oxidisable sulphur" is meant the sulphur contained in the polythionates which can be oxidized to sulphur trioxide. The term does not include free sulphur or the combined sulphur in any sulphite which may be present. In the case of basic aluminium sulphate absorbent, it also becomes difficult to maintain the basicity of the liquor at the desired value due to the rapid accumulation of the sulphate radical, when the concentration of the thionates exceeds that equivalent to 0.15 gm. of oxidisable sulphur per 100 milliliters.

Following my discoveries that the reaction $3SO_2 \rightarrow 2SO_3 + S$ is auto-catalytic in the presence of thionates, and that the rate of reaction is slow when the concentration of thionates in the absorbent liquor is lower than that equivalent to 0.15 gm. of oxidisable sulphur per 100 milliliters. I have developed a method whereby the concentration of the thionates in aqueous absorbent used for the recovery of sulphur dioxide can be controlled so that difficulties in the operation of the absorption-regeneration process and extensive losses of the valuable sulphur dioxide are avoided, at the same time obtaining a considerable decrease in the extent of sulphate ion removal which normally must be undertaken with such aqueous absorbents.

According to the present invention, before the thionate concentration of the aqueous absorbent has exceeded that equivalent to 0.18 gm. of oxidisable sulphur per 100 milliliters the said absorbent, containing sulphur dioxide in sufficient concentration, is boiled in the presence of a copper compound the anion of which is such that it is without injurious effect on the absorbent solution, the quantity of copper compound used being at least sufficient to depress the concentration of thionates to a value below that equivalent to 0.15 gm. of oxidisable sulphur per 100 milliliters but insufficient to cause complete decomposition of the thionates, so that no soluble copper compounds are left in the absorbent solution on its return to the sulphur dioxide absorption-regeneration process.

It is preferable to maintain the thionate concentration below that equivalent to 0.15 gm. of oxidisable sulphur per 100 milliliters, since it is thereby possible to use the absorbent continuously for an indefinite period and to destroy thionate as it is formed by removing from time to time a proportion of the absorbent liquor from the main circulating system, treating it as hereinbefore defined and then returning it to the main body of liquor in circulation. If the thionate concentration ever exceeds the equivalent 0.15 gm. of oxidisable sulphur per 100 milliliters, then it is necessary to treat the whole of the circulating liquor for thionate removal in such a manner that the treated liquor does not come into contact with untreated liquor. It is also preferable to remove all traces of sulphur from the plant before the treated liquor is returned for re-use.

It is unnecessary for the liquor to be completely saturated with sulphur dioxide but it is essential to provide for the presence of sulphur dioxide in quantities sufficient to convert the thionates to trithionate, the copper salt of which then decomposes in the presence of water to give copper sulphide and sulphuric acid.

The copper compounds may be for example copper sulphate or copper carbonate, and it is possible to add them as such, or in the form of an aqueous solution or suspension, respectively. As can be seen from the equations— polythionates (except trithionate) + $SO_2 \rightarrow$ trithionate $CuS_3O_6 + 2H_2O \rightarrow CuS + 2H_2SO_4$ the amount of the copper compound to be added requires to be equivalent to 1 gm. atom of copper to 3 gms. atoms of oxidisable sulphur as thionates, for the complete removal of the latter.

In view of the discovery that the presence of copper is deleterious for the successful operation of the sulphur dioxide recovery process, it is preferable to treat the absorbent liquor in batches. Thus, for example, in the case where the concentration of thionate in the liquor is maintained below that equivalent to 0.15 gm. of oxidisable sulphur per 100 milliliters, a portion of the liquor immediately after being used for the absorption of sulphur dioxide is withdrawn from the absorption system, treated with a suitable compound of copper, and then boiled. A sample of the liquor thus treated is filtered to remove precipitated copper sulphide and is subsequently tested for the presence of copper. If the latter is absent, the treated liquor may be cooled, filtered, and returned to the absorption-regeneration process, or to the absorbent liquor stock tanks. If copper is present in the filtered sample of the liquor, it is sufficient to add to the main bulk of the treated portion of the liquor sufficient untreated thionate-containing liquor to ensure that the whole of the copper present is precipitated, by additional boiling, as sulphide. After cooling and filtration, the solution can be returned to the absorption-regeneration system or to the absorbent liquor stock tanks. By treatment of batches at suitable intervals, as described above, the thionate concentration in the absorbent liquor can be maintained below that equivalent to 0.15 gm. of oxidisable sulphur per 100 milliliters without affecting the satisfactory operation of the sulphur dioxide absorption-regeneration process.

*Example 1*

An absorption-regeneration system was in operation with 50 $M^3$ of basic aluminium sulphate solution in circulation. When the thionates in this liquor had reached a concentration equivalent to 0.10 gm. of oxidisable sulphur per 100 milliliters a 10 $M^3$ batch of liquor was withdrawn from circulation, after being used for the absorption of sulphur dioxide, and treated as follows:

20 kg. of copper sulphate crystals, dissolved in water, were added and the mixture was boiled for one hour. A test on a filtered sample of the liquor indicated that the copper ion was absent. The batch of liquor was cooled and made up to 10 $M^3$ with water, to compensate for that lost by evaporation. The thionate concentration in the treated batch of liquor was then equivalent to 0.023 gm. of oxidisable sulphur per 100 milliliters. The cooled batch of liquor was filtered, the filtrate being returned to circulation. A further 10 M³ batch of the circulating liquor was treated exactly as described above and returned to the circulating liquor, after which the concentration of thionates present in the whole of the circulating liquor was found to be equivalent to 0.069 gm. of oxidisable sulphur per 100 milliliters. By this means the aqueous absorbent is maintained in continuous and satisfactory operation.

The concentration of thionate may be allowed to build up to a figure equivalent to between 0.15 and 0.18 gm. oxidisable sulphur per 100 milliliters before thionate removal is effected or such concentration may inadvertently be reached in processes operating normally below the figure of 0.15 due to, for example, a sudden occurrence of hydrogen sulphide and/or high concentrations of elemental sulphur in the gases treated. In both these cases there are two alternative methods of operation:

(1) All the liquor in circulation in the absorption-regeneration system is saturated with sulphur dioxide and transferred to a separate stock tank, after which the absorption-regeneration plant is thoroughly washed out. The sulphur-dioxide-containing liquor is then treated in batches as hereinbefore described, the filtered liquor finally being collected in a clean stock tank, ensuring that no treated liquor comes into contact with untreated liquor. When the whole of the absorbent liquor is thus treated, it is then returned to the absorption-regeneration system for re-use.

(2) Batches of the liquor are withdrawn from circulation and treated for thionate removal, as hereinbefore described, after which they are collected in a clean tank and not allowed to mix with untreated liquor. When the amount of untreated liquor in circulation in the absorption-regeneration plant reaches the minimum required for correct operation, the untreated liquor can be replaced by the treated liquor, care being taken to avoid mixing. The thionates may then be removed from the remaining untreated liquor, the treated and filtered batches being returned to the circulation system. This method is convenient where it is undesirable or impossible to shut down the absorption-regeneration plant.

*Example 2*

An absorption-regeneration system was in operation with 50 M³ of basic aluminium sulphate solution in circulation. After some time it was found that the concentration of thionates had risen to a value equivalent to 0.18 gm. of oxidisable sulphur per 100 milliliters. Considerable difficulty was experienced in obtaining satisfactory operation of the plant and it became necessary to treat the whole of the absorbent liquor.

Two 10 M³ batches of liquor were withdrawn from circulation in succession after being used for the absorption of sulphur dioxide, and treated as explained in Example 1, except that 40 kg. of copper sulphate crystals dissolved in water were added to each batch, and that the cooled and filtered liquor from each treatment was placed in a clean stock tank which was disconnected from the circulation system. The thionate concentration in the treated liquor was then equivalent to 0.026 gm. of oxidisable sulphur per 100 milliliters. Meanwhile 5 M³ of water had been added to the remaining 30 M³ of the circulating liquor, the thionate concentration of which was still equivalent to 0.18 gm. of oxidisable sulphur, due to accumulation while treating the other batches. The addition of this water was necessary in order that after the removal of a further 10 M³ batch of sulphur dioxide-containing liquor, the remainder was sufficient for satisfactory operation of the absorption-regeneration system. This further 10 M³ was treated as above with 40 kg. of copper sulphate dissolved in water, the cooled and filtered liquor, without adjusting its volume for losses, being placed in the stock tank which already contained the two previously treated batches. The stock tank containing the treated liquor was then placed in connection with the circulating system, while the remaining 25 M³ of untreated liquor was withdrawn and treated as above described, without adjusting its volume for losses, the liquor being finally returned to circulation. While this latter liquor was being treated, the opportunity was taken to wash out any remaining stock tanks, so that the treated liquor could not come into contact with any liquor which was excessively contaminated with thionates. The final liquor in circulation then contained thionates equivalent to 0.031 gm. of oxidisable sulphur per 100 milliliters.

Instead of the copper sulphate used in Example 1 I could have used copper carbonate, copper hydroxide, copper oxide, metallic copper.

This invention is a valuable advance in the art as it reveals a method whereby the average rate of oxidation of the sulphur dioxide passing through the absorption-regeneration plant is kept low, which in turn means that smaller quantities of a calcium compound or compounds, for example, calcium carbonate, are used for the removal of undesirable sulphate ions from the liquor, for example, according to the process described in British patent specification No. 445,711. Further, as there is less precipitated calcium sulphate to be removed, for example, by filtration, from the absorption liquor, there is a smaller loss of the latter on the filter cake.

As many apparently widely different embodiments of this invention may be made without departing from the spirit and scope thereof, it is to be understood that the invention is not limited to the specific embodiments thereof except as defined in the appended claims.

I claim:

1. In a process for the recovery of sulphur dioxide from gaseous mixtures by the use of sulphur dioxide absorbing liquids which consist of aqueous solutions of salts, the method of maintaining the concentration of thionates which accumulate in the absorbent below a value equivalent to 0.15 gm. of oxidisable sulphur per 100 milliliters of absorbent, which comprises drawing off and boiling a portion of the absorbent, containing sulphur dioxide in sufficient concentration to enable conversion of poly-thionates into trithionate, in the presence of a substance of the class consisting of copper and those copper compounds the anions of which are without injurious effect on the absorbent, in an amount less than that required for complete decomposition of the thionates in the part withdrawn, filtering off the precipitate so formed and returning the filtrate to the remainder of the absorbent.

2. In a process for the recovery of sulphur dioxide from gaseous mixtures by the use of sulphur dioxide absorbing liquids which consist of aqueous solutions of salts, the method of removing thionates which accumulate in the absorbent before their concentration has exceeded a value equivalent to 0.18 gm. of oxidisable sulphur per 100 milliliters of absorbent, which comprises boiling the absorbent, containing sulphur dioxide in sufficient concentration to enable conversion of poly-thionates into trithionate, in the presence of a substance of the class consisting of copper and those copper compounds, the anions of which are without injurious effect on the absorbent, in an amount less than that required for the complete decomposition of the thionates in the absorbent, but in an amount at least sufficient to depress the concentration of thionates in the absorbent to a value below that equivalent to 0.15 gm. of oxidisable sulphur per 100 milliliters, and filtering off the precipitate so formed.

3. In a process for the recovery of sulphur dioxide from gaseous mixtures by the use of sulphur dioxide absorbing liquids which consist of aqueous solutions of salts, the method of removing thionates which accumulate in the absorbent, before their concentration has exceeded a value equivalent to 0.15 gm. of oxidisable sulphur per 100 milliliters of absorbent, which comprises boiling the absorbent, containing sulphur dioxide in sufficient concentration to enable conversion of poly-thionates into trithionate, in the presence of a substance of the class consisting of copper and those copper compounds, the anions of which are without injuriius effect on the absorbent, in an amount less than that required for the complete decomposition of the thionates, and filtering off the precipitate so formed.

4. In a process for the recovery of sulphur dioxide from gaseous mixtures by the use of sulphur dioxide absorbing liquids which consist of aqueous solutions of salts, the method of removing thionates which accumulate in the absorbent before their concentration has exceeded that equivalent to 0.18 gm. of oxidisable sulphur per 100 milliliters of absorbent, which comprises withdrawing successive portions of the absorbent, boiling the absorbent, containing sulphur dioxide in sufficient concentration to enable conversion of poly-thionates into trithionate, in the presence of a substance of the class consisting of copper and those copper compounds, the anions of which are without injurious effect on the absorbent, filtering off the precipitate so formed and collecting the filtrates from the individual treatments until the whole of the absorbent is treated, the quantity of the copper-containing substance used in each treatment being less than that required for the complete decomposition of the thionates in the part withdrawn, but at least sufficient to depress the concentration of thionates in the part withdrawn to a value such that the concentration of thionates in the whole of the treated absorbent will be below a value equivalent to 0.15 gm. of oxidisable sulphur per 100 milliliters of absorbent.

5. In a process for the recovery of sulphur dioxide from gaseous mixtures by the use of sulphur dioxide absorbing liquids which consist of aqueous solutions of salts, the method of removing thionates which accumulate in the absorbent, before their concentration has exceeded that equivalent to 0.18 gm. of oxidisable sulphur per 100 milliliters of absorbent, which comprises drawing off sufficient absorbent to run the plant, at the same time leaving sufficient absorbent in the plant to maintain operation, boiling the portion withdrawn, containing sulphur dioxide in sufficient concentration to enable conversion of poly-thionates into trithionate, with a substance of the class consisting of copper and those copper compounds, the anions of which are without injurious effect on the absorbent, in an amount less than that required for the complete decomposition of the thionates in the part withdrawn, but at least sufficient to depress the concentration of the thionates below that equivalent to 0.15 gm. of oxidisable sulphur per 100 milliliters, filtering off the precipitate so formed, drawing off the absorbent remaining in the plant, replacing it with filtrate, and then treating the remainder of the absorbent for thionate removal in the same manner and returning it to the plant.

6. In a process for the recovery of sulphur dioxide from gaseous mixtures by the use of sulphur dioxide absorbing liquids which consist of aqueous solutions of salts, the method of removing thionates which accumulate in the absorbent, after the concentration of thionates has exceeded that equivalent to 0.18 gm. of oxidisable sulphur per 100 milliliters of absorbent, which comprises boiling said absorbent, containing sulphur dioxide in sufficient concentration to enable conversion of poly-thionates into trithionate, in the presence of a substance of the class consisting of copper and those copper compounds, the anions of which are without injurious effect on the absorbent, in an amount less than that required for the complete decomposition of the thionates in the absorbent, but in an amount at least sufficient to depress the concentration of thionates in the absorbent to a value below that equivalent to 0.15 gm. of oxidisable sulphur per 100 milliliters, and filtering off the precipitate so formed.

NORMAN LEVY.